2,903,905
Patented Sept. 15, 1959

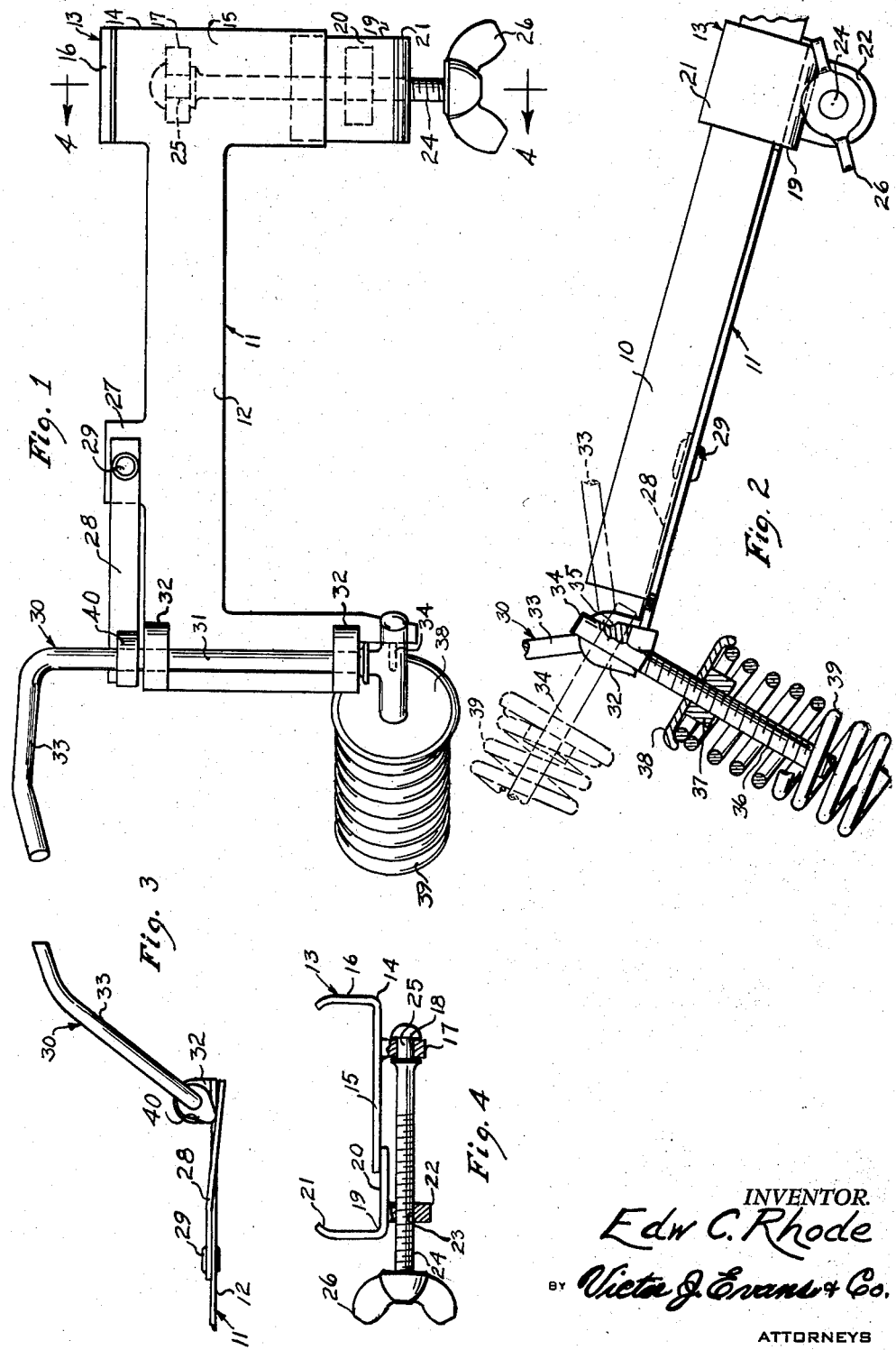

2,903,905
SPEED CONTROL DEVICE
Edward C. Rhode, Port Lavaca, Tex.

Application April 18, 1957, Serial No. 653,610

4 Claims. (Cl. 74—513)

This invention relates to a vehicle, and more particularly to a speed control device for a vehicle.

The object of the invention is to provide a speed control device for connection to an accelerator pedal of a vehicle wherein a means is provided for controlling the speed of the vehicle.

Another object of the invention is to provide a speed control device which can be arranged in one position so as to help prevent the vehicle from exceeding a predetermined speed limit, and wherein the device can be moved to a different position so that there is no interference with normal use of the accelerator pedal.

A further object of the invention is to provide a speed control device which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a top plan view of the speed control device, constructed according to the present invention.

Figure 2 is a side elevational view showing the speed control device mounted on an accelerator pedal, and with parts broken away and in section.

Figure 3 is a fragmentary elevational view illustrating the trip lever, cam and spring member.

Figure 4 is a sectional view taken on the line 4—4 of Figure 1.

Referring in detail to the drawings, the numeral 10 indicates an accelerator or gas pedal which is of conventional construction, and which is a part of a vehicle such as an automobile or truck or the like, and the present invention is directed to a speed control device for connection to the accelerator pedal 10. The speed control device of the present invention includes a body member which is indicated generally by the numeral 11, and the body member 11 includes a main portion 12 which has a clamp 13 on one end thereof, Figure 4. The clamp 13 includes a first jaw 14 which is provided with a base 15 that extends beneath the accelerator pedal 10, and extending upwardly from the base 15 is a lip 16. A flange 17 depends from the base 15 and is secured thereto or formed integral therein, and the flange 17 is provided with an opening 18. There is further provided a second jaw 19 for coaction with the first jaw 14, and the jaw 19 includes a base 20 and an upstanding lip 21. Depending from the base 20 of the jaw 19 is a flange 22 which is provided with a threaded opening 23, and a screw member 24 extends through the opening 23 and has a portion 25 connected to the opening 18 in the flange 17. A nut or hand gripping element 26 is mounted on an end of the screw member 24.

The speed control device of the present invention further includes a spring member 28 which has one end connected to a shoulder 27 on the body member 11 through the medium of a securing element 29. A movable trip lever 30 includes a first portion 31 which is rotatably supported in bearing blocks 32 that extend upwardly from an end of the body member 11. The trip lever 30 further includes a second portion 33 which is arranged angularly with respect to the first portion 31, and the trip lever 30 further includes a third portion 34 which is arranged transversely or angularly with respect to the other end of the portion 31. A stop member 35 is arranged on the portion 34 for engagement with a portion of the body member 11 so as to limit pivotal movement of the lever 30 in one direction.

A portion 34 of the trip lever 30 is threaded externally as at 36, and a nut 37 is arranged in threaded engagement with the portion 36 of the portion 34. A collar 38 is mounted on the portion 36, and there is further provided a coil spring 39 which abuts the collar 38. A cam 40 is mounted on the portion 31 of the trip lever 30, for engagement with an end of the spring member 28.

From the foregoing, it is apparent that there has been provided a speed control device which is adapted to be mounted on a gas or accelerator pedal of a vehicle such as the pedal 10. The speed control device includes the body member 11 which is arranged beneath the pedal 10, and the body member 11 is held in place by means of the clamp 13. The clamp 13 includes jaws 14 and 19 which can be adjusted by turning the screw member 24 by means of the finger piece 26 whereby the lips 16 and 21 can be brought into engagement with the sides of the pedal 10 so as to maintain the device connected to the pedal. The screw member 24 is arranged in threaded engagement with the opening 23, and the screw member includes the end portion 25 which is connected to the flange 17 so that by properly rotating the screw member 24, the jaws can be spread apart or closed depending upon whether the device is being removed or mounted on the pedal 10. When the device is being used, the parts are in the solid line position shown in Figure 2 whereby the lower end of the coil spring 39 can rest against the floor board of the vehicle. Then, when foot pressure is applied to the pedal 10, the coil spring 39 will offer resistance to downward movement of the foot pedal 10 whereby the vehicle can be kept within certain speed limits or ranges of speed. However, the coil spring 39 will flex sufficiently so as to permit the accelerator pedal 10 to move downwardly a sufficient distance to permit the vehicle to be accelerated or decelerated within certain limits. In the event that the operator of the vehicle desires to use the pedal 10 in a normal manner without the speed control device of the present invention, it is only necessary to place the foot in engagement with the portion 33 of the trip lever 30 whereby the parts can be moved or pivoted from the solid line position shown in Figure 2 to the dotted line position of Figure 2 whereby the coil spring 39 will be out of engagement with the floor so that the foot pedal 10 can be depressed in the usual manner. This pivotal movement of the parts is possible since the portion 31 of the trip lever 30 is pivotally mounted in the bearings 32. The cam 40 coacts with the spring member 28 to maintain its parts immobile in their various adjusted positions.

Thus, it will be seen that there has been provided a speed control device or accelerator governor for a vehicle such as an automobile wherein the device clamps to the under side of the vehicle accelerator pedal 10. The device provides a positive means for limiting engine throttle control and yet permits the device to be readily adjusted as desired. By exerting greater than normal pedal pressure, the device can be overridden. Or, by nudging the portion 33 of the lever 30 with the toe, the device can be entirely relaxed so as to provide full throttle control. The jaw 14 is formed integral with the rear end of the body member 11, while the jaw 19 can be adjusted with respect to the jaw 14 by means of the screw member 24. The parts can be made of any suitable material and in different shapes or sizes. The spring member 28 exerts pressure upon the cam 40 so as to maintain the trip lever 30 and its associated parts, in the different adjusted positions until these parts are moved. The trip lever 30 and spring 39 can be readily rotated from the solid line position of Figure 2 to the dotted line position of Figure 2 which is approximately 90° away so that the device can be moved to a nonoperating position and the parts are adapted to be maintained in the dotted line position of Figure 2 by means of the coacting cam 40 and spring member 28. When the device is in operative position, the lower end of the spring 39 rests against the floor board of the vehicle and the nut 37 and collar 38 can be screwed up or down on the portion 36 so as to permit a preselected amount of throttle speed travel.

For example, the device can be set to permit operation of the vehicle at sixty miles per hour and the person's foot can rest comfortably on the foot pedal 10 and the vehicle will stay at sixty miles per hour or else the device can be set to permit operation of the vehicle at any other desired speed. In testing a vehicle, it is only necessary to press down on the pedal harder so that an additional ten or twenty miles per hour can be gained. The device of the present invention is especially suitable for breaking in new automobiles which should not be driven over a certain speed.

The above description of the invention is for illustrative purposes only and it is understood that modifications may be made in the construction within the scope and spirit of the following claims.

I claim:

1. In a speed control device for an accelerator pedal, a body member arranged below said pedal and including a main straight portion, a clamp including a first jaw having a base and an upstanding lip, a flange depending from said base, a movable second jaw arranged contiguous to said first jaw and including a base and an upturned lip, a flange depending from said last named base and provided with a threaded aperture therein and a screw member extending through said aperture and connected to the flange on the first jaw of said clamp, the jaws of said clamp adapted to engage the accelerator pedal, a shoulder extending outwardly from a side of said body member, a spring member having one end connected to said shoulder, a pair of spaced parallel bearing blocks extending upwardly from an end of said body member, a trip lever including a first portion rotatably supported in said bearing blocks, a cam on said first portion for engagement with said spring member, a second portion extending transversely from one end of said first portion, a third portion arranged transversely with respect to the other end of said first portion, and a coil spring mounted on the third portion of said trip lever.

2. A speed control device for an accelerator pedal of a vehicle, embodying a body member positioned below the accelerator pedal, clamping means for releasably connecting the body member to the accelerator pedal, a pair of spaced parallel bearing blocks extending upwardly from an end of said body member, a trip lever pivotally connected to said body member, said trip lever including a first portion rotatably supported in said bearing blocks, a cam on said first portion for engagement with said spring member, a second portion arranged transversely with respect to one end of said first portion, and resilient means carried by the third portion of said trip lever.

3. A speed control device for an accelerator pedal of a vehicle, embodying a body member positioned below the accelerator pedal, clamping means for releasably connecting the body member to the accelerator pedal, a trip lever pivotally connected to said body member, and resilient means carried by said trip lever, said clamping means including a first jaw having a base and an upstanding lip, a flange depending from said base, a movable second jaw arranged contiguous to said first jaw and including a base and an upturned lip, a flange depending from said last named base and provided with a threaded aperture therein, a screw member extending through said aperture and connected to the flange on the first jaw of said clamp.

4. A speed control device for an accelerator pedal of a vehicle, embodying a body member positioned below the accelerator pedal, clamping means for releasably connecting the body member to the accelerator pedal, a shoulder extending outwardly from a side of said body member, a spring member having one end connected to said shoulder, a trip lever pivotally connected to said body member, a cam on said trip lever for engagement with said spring member, and resilient means carried by said trip lever, said clamping means comprising a pair of spaced apart jaws, said resilient means comprising a coil spring.

References Cited in the file of this patent

UNITED STATES PATENTS 1,252,238    Clark _____ Jan. 1, 1918